INVENTORS
JACK F. SHANNON
JAMES ADAMS
BY
ATTORNEY

United States Patent Office 3,422,675
Patented Jan. 21, 1969

3,422,675
ENTHALPY SENSOR
Jack F. Shannon, Euclid, and James Adams, Cleveland, Ohio, assignors to Bailey Meter Company, a corporation of Delaware
Filed Aug. 30, 1965, Ser. No. 483,572
U.S. Cl. 73—190　　5 Claims
Int. Cl. G01k *17/00*

ABSTRACT OF THE DISCLOSURE

A device for the measurement of enthalpy of a flowing fluid where a fluid sample is passed in series flow through two spaced-apart, critical flow orifices. The sample fluid is heated to bring it into the superheat region as it passes between the orifices. Pressure transducers measure the fluid pressure at the inlet of each of the two flow orifices and produce signals to which a computing means is responsive and which produces an output signal corresponding to the enthalpy of the fluid.

---

This invention relates to a device for the fast and continuous measurement of the in situ enthalpy and related properties such as quality, moisture or specific volume of a flowing fluid. While not limited thereto, our invention is particularly applicable to the fast and continuous measurement of the in situ enthalpy of a saturated flowing liquid-vapor mixture, as for example steam, at high pressure, above the range in pressures in which the well-known throttling calorimeter can be used.

In accordance with our invention a continuous sample of the steam, or other fluid, is passed in series flow through two spaced-apart critical flow orifices. As the flow through an orifice is practically an adiabatic process, it follows, that after passing through the first orifice the steam or other fluid may be saturated and wet. Accordingly and further in accordance with our invention the sample is reheated to bring it into the superheat region. The enthalpy can then be derived from the equation:

$$h_1 = aP_1 + bP_2 + c \tag{1}$$

where:

$h_1$ = enthalpy of fluid at inlet to first orifice
$P_1$ = Inlet pressure at first orifice
$P_2$ = Inlet pressure at second orifice
$a$, $b$ and $c$ are coefficients In the drawings.

Figure 1:
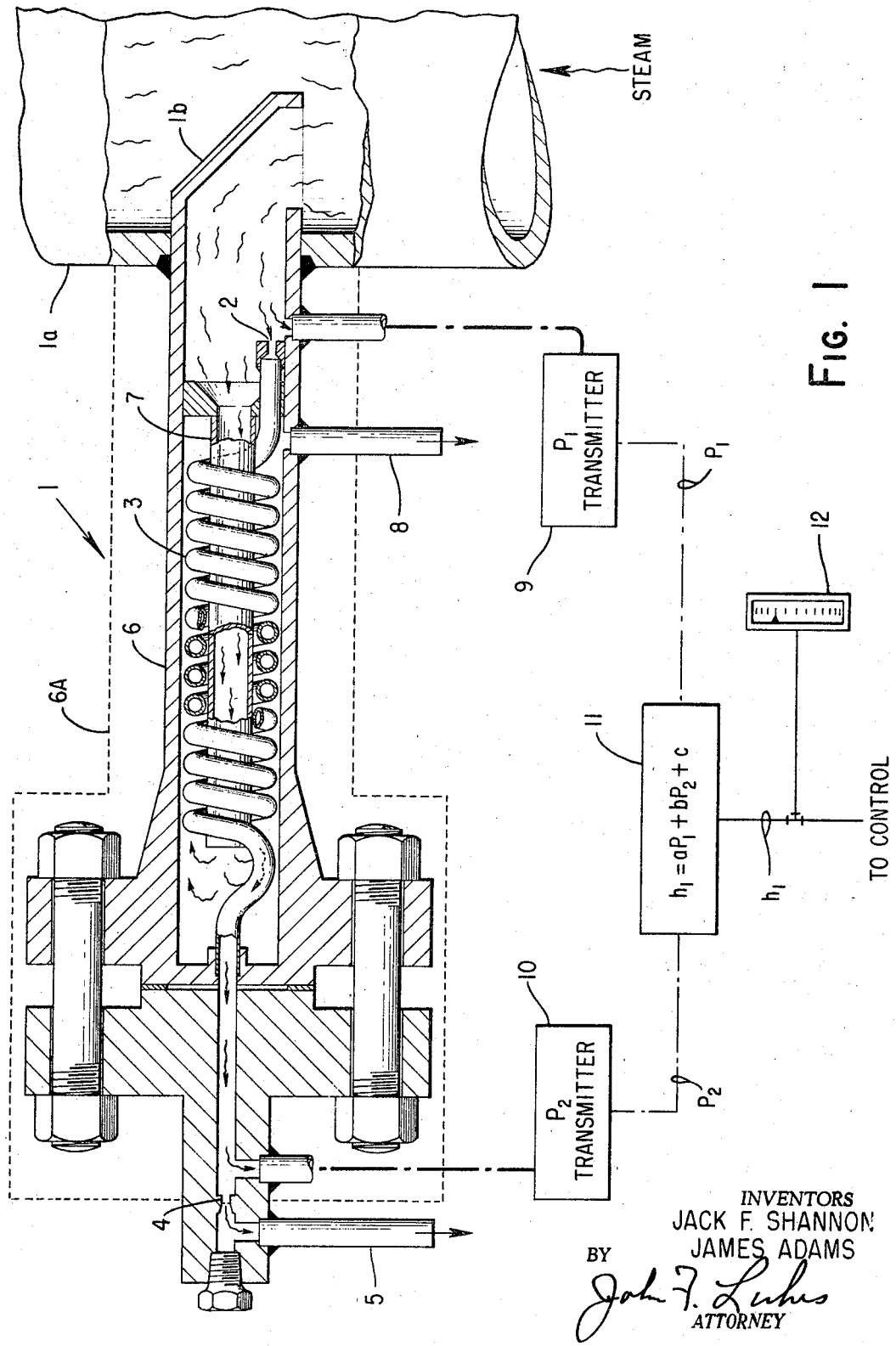
FIG. 1 illustrates, partially in cross section, an enthalpy sensor and one form of computer circuit embodying our invention.

Referring now to FIG. 1 we show our sensor, generally indicated at 1, arranged to continuously determine the in situ enthalpy of a saturated, liquid-steam mixture at high pressure flowing through a conduit 1a. A continuous sample of the steam is bled from the conduit 1a through a nozzle 1b to obtain a representative sample. The sample then flows through a first critical flow orifice 2, thence through a helical tube 3, thence through a second critical flow orifice 4 and is then discharged to atmosphere or other point of wastage or heat recovery through a pipe 5. Surrounding the helical tube 3 is a jacket or casing 6 into which steam is admitted from the conduit 1a through a pipe 7 and which after passing over the helical tube 3 is discharged through a pipe 8 to a point of wastage or heat recovery. The design of the helical tube 3 and casing 6 is preferably such that the steam in passing through the helical tube 3 is reheated to substantially the same temperature as the steam in conduit 1a. As shown, the casing 6 may be provided with external insulation, such as indicated at 6A, to reduce the heat transfer and hence heat wastage. While we have illustrated and described use of the steam in conduit 1a as a means for reheating the steam within helical tube 3 it is apparent that if such is not expedient an external source of heat could be used. Further, while desirable to reheat the steam to its initial temperature, such is not necessary and in some cases it may be preferable to reheat to a lower or higher temperature, generally it being sufficient to reheat the steam to a point in the superheat region.

Figure 2:
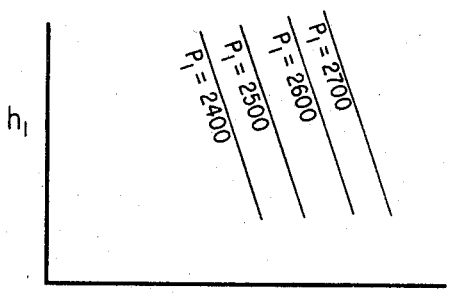
FIG. 2 is a graphical representation of Equation 1 showing a typical relationship getween $h_1$, $P_1$ and $P_2$.

In the usual case, as illustrated in FIG. 2, $h_1$, $P_1$ and $P_2$ are linearly related and the coefficients $a$, $b$ and $c$ are therefore constants which may be empirically determined or rationally derived if the properties of the fluid are known. The enthalpy or a property of the fluid related thereto can then be computed as shown schematically in FIG. 1. Thus signals proportional to pressures $P_1$ and $P_2$ are generated by means of transmitters 9 and 10 respectively. These signals are transmitted to a computing device 11 which solves Equation 1 and which generates an output signal proportional to $h_1$. This output signal may be used to operate an indicator or other measuring device such as shown at 12 or for control purposes. If the pressure of the vapor within conduit 1a is constant then $h_1$ is a function solely of $P_2$ and transmitter 9 and the signal derived therefrom may be omitted.

Figure 3:
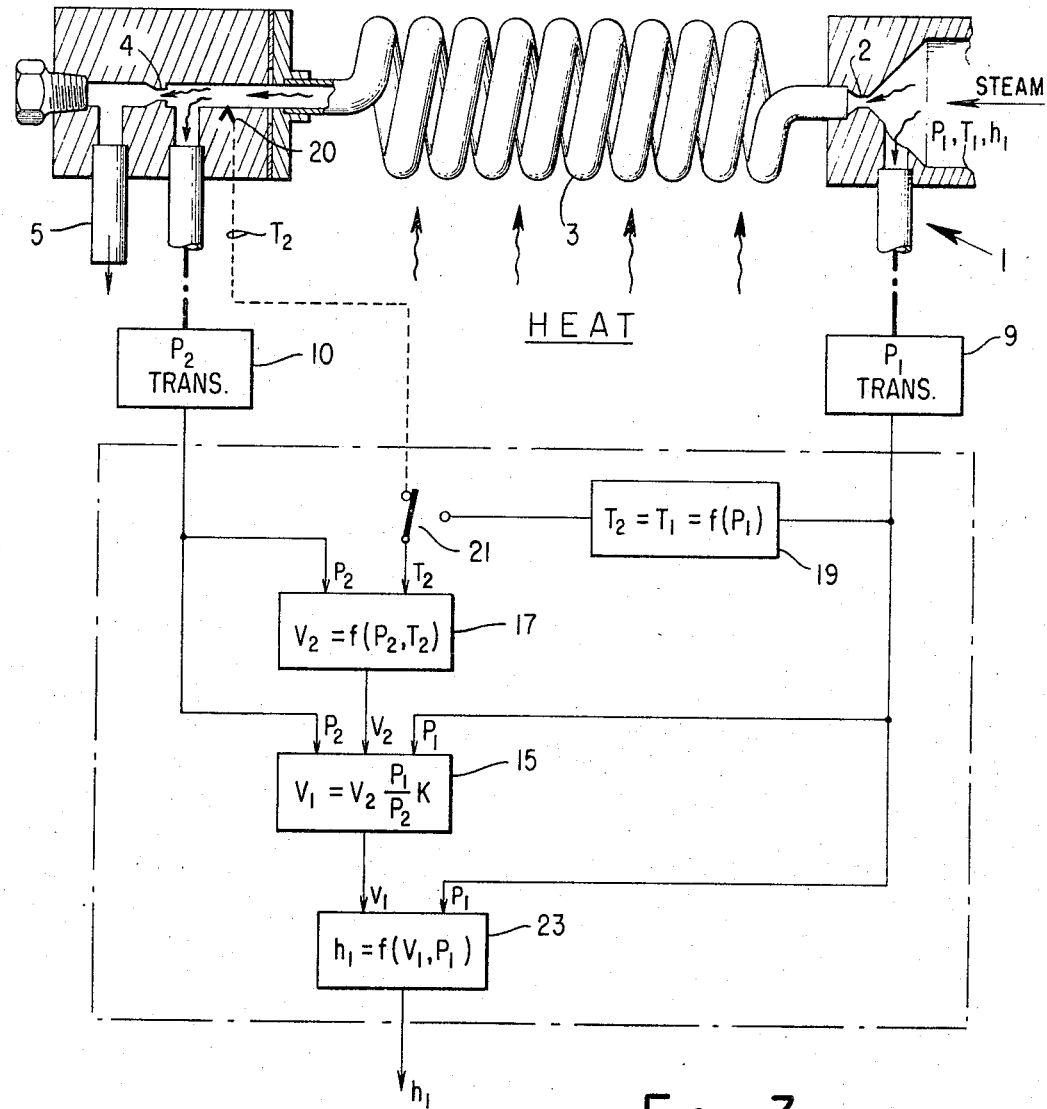
FIG. 3 illustrates schematically a modified computer circuit which may be incorporated in our enthalpy sensor.

In those cases where $h_1$, $P_1$ and $P_2$ are nonlinearly related and the coefficients $a$, $b$ and $c$ therefore not constants a computing system such as shown schematically in FIG. 3 may be used to determine $h_1$ and any related property. As in accordance with our invention the fluid between the orifices is heated until in the superheat region, the specific volume ($V_2$) of the fluid at the inlet to the second orifice may be determined from the pressure-temperature-specific volume relationship. Or if as previously suggested the temperature ($T_2$) of the fluid at the inlet to the second orifice is made substantially equal to the initial temperature ($T_1$) of the sample, then this temperature ($T_1$) as well as the temperature ($T_2$) at the inlet to the second orifice is a function of the pressure ($P_1$) of the sample flowing into the sensor.

Knowing $V_2$, the specific volume ($V_1$) of the fluid ahead of the first orifice may be computed from the equation:

$$V_1 = V_2 \frac{P_1}{P_2} K \tag{2}$$

where:

$V_1$ = Specific volume at inlet to first orifice
$V_2$ = Specific volume at inlet to second orifice
$K$ = a constant In FIG. 3 we show the signals generated by transmitters 9 and 10 introduced into a computing device 15 which solves Equation 2, generating an output signal proportional to $V_1$. Also introduced into the computing device 15 is a signal proportional to $V_2$ generated by a device 17 from signals proportional to $P_2$ and $T_2$. As shown the signal proportional to $T_2$ may be derived directly as by a thermocouple or other temperature responsive device 20, or where $T_2$ is equal to or about equal to $T_1$ indirectly from the signal proportional to $P_1$ properly characterized by a function generator 19. To indicate the availability of such alternate arrangements a switch 21 is shown for selectively introducing one or the other signal into the device 17. A computing device 23 responsive to the signal generated by the device 15 and the signal proportional to $P_1$ then produces an output signal corresponding to $h_1$ or any related fluid property. As related with reference to FIG. 1, the output signal from the device 23 may be used to operate a measuring device or for control purposes.

As evident to those skilled in the art the functional relation between the input signals and output signal of devices 17, 19 and 23 may be determined from tables as, for example, the well-known Steam Tables, if the fluid in question is steam or derived from the equations of state for the fluid in question. The devices 17, 19 and 23 may then be programmed in accordance with the functional relationship so determined.

While we have described our invention as a means for determining the in situ enthalpy of a flowing fluid it is apparent that, as previously mentioned, in so doing, it can also generate a signal corresponding to other related properties such as quality, moisture or specific volume.

What we claim as new and desire to secure by Letters Patent of the United States is:

1. In a sensing device for determining the enthalpy of a substantially constant pressure saturated vapor, comprising:
    a sampling tube through which the vapor flows;
    a pair of spaced-apart critical flow orifices in said tube;
    heating means for raising the temperature of the vapor between said orifices to substantially the temperature of the vapor admitted to said sampling tube;
    a pressure transducer producing a signal proportional to the pressure of the vapor in said tube between said first and second orifices; and
    computing means responsive to said signal producing an output signal functionally related to said first named signal and corresponding to the enthalpy of the vapor.

2. A sensing device as set forth in claim 1 wherein said heating means utilizes the fluid flowing into said sampling tube as the heating medium.

3. In a sensing device for determining the enthalpy or a functionally related property of a saturated vapor, the combination comprising:
    a sampling tube through which the vapor passes;
    a first critical flow orifice disposed at the entrance to said tube;
    a second critical flow orifice disposed at the exit from said tube;
    means for heating the vapor in said tube between said first and second orifices to substantially the temperature of the vapor admitted to said sampling tube;
    a first pressure transducer producing a first signal ($P_1$) proportional to the pressure of the vapor in said tube ahead of said fist orifice;
    a second pressure transducer producing a second signal ($P_2$) proportional to the pressure of the vapor in said tube between said first and second orifices; and
    computing means responsive to said first and second signals producing an output signal functionally related to said first and second signals and corresponding to the enthalpy or a functionally related factor thereof of the saturated vapor.

4. A sensing device as set forth in claim 3 wherein said heating means utilizes the fluid flowing into said sampling tube as the heating medium.

5. A sensing device as set forth in claim 3 wherein said computer means produces an output signal ($E_0$) in accordance with the equation:

$$E_4 = aP_1 + bP_2 + c$$

where:
$a$, $b$, and $c$ are coefficients.

References Cited

UNITED STATES PATENTS

| | | | |
|---|---|---|---|
| 3,204,447 | 9/1965 | Krause et al. | 73—15 |
| 3,301,059 | 1/1967 | Haas | 73—339 |

RICHARD C. QUEISSER, *Primary Examiner.*

E. D. GILHOOLY, *Assistant Examiner.*

UNITED STATES PATENT OFFICE
CERTIFICATE OF CORRECTION

Patent No. 3,422,675

January 21, 1969

Jack F. Shannon et al.

It is certified that error appears in the above identified patent and that said Letters Patent are hereby corrected as shown below:

Column 4, line 29, the equation should appear as shown below:

$$E_O = aP_1 + bP_2 + c$$

Signed and sealed this 31st day of March 1970.

(SEAL)
Attest:

Edward M. Fletcher, Jr.
Attesting Officer

WILLIAM E. SCHUYLER, JR.
Commissioner of Patents